H. C. JONES.
STAVE-BASKET.

No. 169,447. Patented Nov. 2, 1875.

Witnesses:

Inventor:
Horace C. Jones
by
Mason, Fenwick & Lawrence
Att'ys

UNITED STATES PATENT OFFICE.

HORACE C. JONES, OF DOWAGIAC, MICHIGAN.

IMPROVEMENT IN STAVE-BASKETS.

Specification forming part of Letters Patent No. 169,447, dated November 2, 1875; application filed August 17, 1875.

CASE B.

*To all whom it may concern:*

Be it known that I, HORACE C. JONES, of Dowagiac, county of Cass and State of Michigan, have invented a new and Improved Stave-Basket; and I do hereby declare that the following is a full, clear, and exact description thereof, reference being had to the accompanying drawings making part of this specification, in which—

Figure 1:
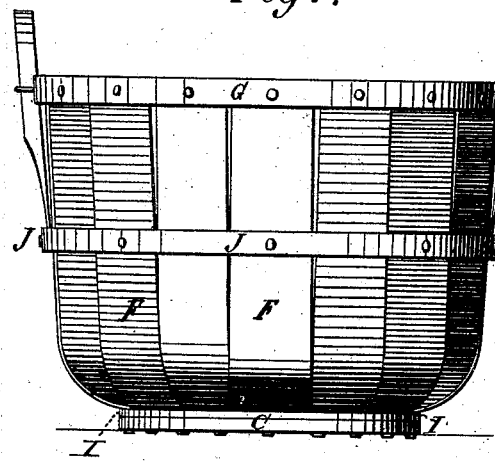
Figure 2:
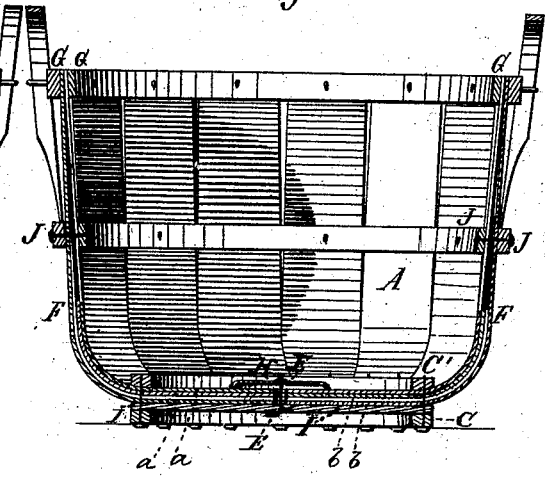
Figures 3, 4:
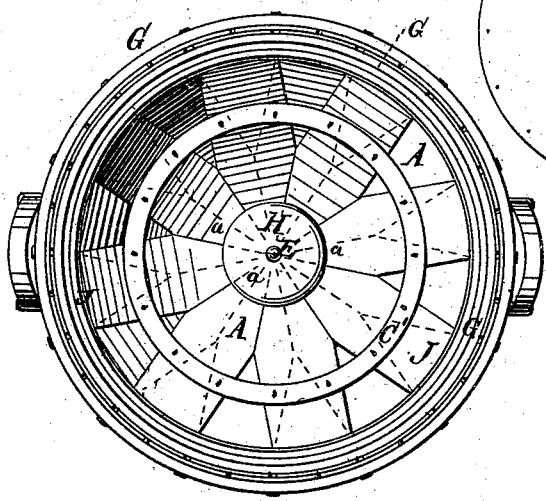

Figure 1 is an outside elevation of my improved basket; Fig, 2, a vertical central section, and Fig. 3 a top view, of the same. Fig. 4 is a view of the circular board used on the outside of the bottom of the basket, above the outer bottom hoop.

My basket is composed of two series of lining-staves, A A, which are tapered to a V-form from the bottom hoops C C′ to the center rivet E, and two series of outer staves, F F, also tapered in a V-form from the said bottom hoops to the said rivet. The lining-staves A are trimmed so as to all come gradually within the same circles as they rise to the top hoops G G of the basket; and the tapered ends of one series of these staves lap upon the tapered ends of the other series. The same order of arrangement is adopted in applying the outer staves F F. Thus there are four thicknesses in the bottom of the basket, from the bottom hoop to the center rivet of the bottom of the basket. On the outer side of the bottom of the basket thus formed of staves a flat circular board, I, is placed, and just inside of the outer circumference of this board one of the bottom hoops C is applied, and directly above this hoop, on the inside of the bottom of the basket, the other hoop C′ is applied, and the whole (staves, board, and bottom hoops) fastened together by nails, as shown. The points *a* of the tapered portions of the staves A are covered and confined by a central washer, H, on the inside of the bottom of the basket, and the points *b b* of the staves F are covered and confined by a circular board, I, on the outside of the bottom of the basket. The washer is clamped to the staves by a broad-headed rivet, E, passed down through it and the bottom board and clinched in a suitable manner, as shown. The middle of the basket is provided with the usual strengthening and binding hoops J J, as shown.

What I claim is—

The stave-basket composed of the two series of lining-staves A and the two series of outer staves F, both series tapered from the bottom hoops C C′ to the central rivet E, and the four series arranged as described, and strengthened and bound together at the center of the bottom by a riveted washer, H, and at about the circumference of the bottom of the basket by hoops C C′ and nails and a circular board, I, extending between the bottom of the basket and the outer bottom hoop C, substantially as herein described and shown.

HORACE C. JONES.

Witnesses:
   B. M. SCHERMERHORN,
   WILLIAM H. TICE.